United States Patent
Liu

(10) Patent No.: US 10,676,362 B2
(45) Date of Patent: Jun. 9, 2020

(54) ROLL-SHAPED AND CONTINUOUS GRAPHENE FILM AND MANUFACTURING METHOD THEREFOR

(71) Applicant: SHENZHEN DANBOND TECHNOLOGY CO., LTD, Shenzhen, Guangdong (CN)

(72) Inventor: Ping Liu, Guangdong (CN)

(73) Assignee: SHENZHEN DANBOND TECHNOLOGY CO., LTD, Shenzhen (CN)

( * ) Notice: Subject to any disclaimer, the term of this patent is extended or adjusted under 35 U.S.C. 154(b) by 235 days.

(21) Appl. No.: 15/823,930

(22) Filed: Nov. 28, 2017

(65) Prior Publication Data

US 2018/0244525 A1 Aug. 30, 2018

Related U.S. Application Data

(63) Continuation of application No. PCT/CN2017/098426, filed on Aug. 22, 2017.

(30) Foreign Application Priority Data

Feb. 27, 2017 (CN) .......................... 2017 1 0108381

(51) Int. Cl.
*C01B 32/184* (2017.01)
*C08J 7/12* (2006.01)
(Continued)

(52) U.S. Cl.
CPC ............. *C01B 32/184* (2017.08); *C08J 7/123* (2013.01); *C10B 53/07* (2013.01); *B82Y 30/00* (2013.01);
(Continued)

(58) Field of Classification Search
CPC .............. C01B 32/174; C01B 2202/36; C01B 2202/34; C01B 2202/26; C01B 2202/22;
(Continued)

(56) References Cited

U.S. PATENT DOCUMENTS

2016/0332327 A1* 11/2016 Li .............................. B32B 7/06
2017/0050852 A1* 2/2017 Ohta ........................ C01B 32/20

FOREIGN PATENT DOCUMENTS

CN 103289402 A 9/2013
CN 103663415 A 3/2014
(Continued)

OTHER PUBLICATIONS

Office Action issued in CN201710108381.9 dated Jul. 5, 2018, with English translation, 15 pages.

*Primary Examiner* — Richard M Rump
(74) *Attorney, Agent, or Firm* — Hamre, Schumann, Mueller & Larson, P.C.

(57) ABSTRACT

A method for manufacturing a roll-shaped and continuous graphene film includes: S1. performing corona treatment on a PI film to obtain a corona PI film, and coiling the corona PI film into a coiled material; S2. heating the coiled material by a heater, and carbonizing the coiled material at a first temperature so as to form a microcrystalline carbon precursor; and S3. graphitizing the carbon precursor at a second temperature, so as to form a graphene film, where in the carbonization and graphitization processes, a central axis of the coiled material is perpendicular, in a same horizontal plane, to a movement direction of the flowing conveyor belt, and the coiled material is horizontally placed and circularly rolls over at 360° around the central axis. Graphene films can be efficiently and continuously produced from roll to roll in large scales with low costs. Moreover, a manufactured product has a high yield.

9 Claims, 2 Drawing Sheets

(51) Int. Cl.
*C10B 53/07* (2006.01)
*B82Y 40/00* (2011.01)
*B82Y 30/00* (2011.01)

(52) U.S. Cl.
CPC ......... *B82Y 40/00* (2013.01); *C01B 2204/065* (2013.01); *Y02P 20/143* (2015.11)

(58) Field of Classification Search
CPC ..... C01B 2202/08; B82Y 30/00; B82Y 40/00; C01P 2006/40; C01P 2004/04; C01P 2004/03; C01P 2004/13
See application file for complete search history.

(56) References Cited

FOREIGN PATENT DOCUMENTS

| | | | | |
|---|---|---|---|---|
| CN | 103864068 A | 6/2014 | | |
| CN | 104495798 A | * 4/2015 | ............. | C01B 32/20 |
| CN | 104495798 A | 4/2015 | | |
| CN | 104609398 A | * 5/2015 | | |
| CN | 105600782 A | * 5/2016 | | |
| CN | 105600782 A | 5/2016 | | |
| CN | 106115670 A | 11/2016 | | |
| CN | 106206050 A | 12/2016 | | |
| CN | 106206682 A | 12/2016 | | |
| CN | 106291991 A | 1/2017 | | |
| CN | 106829930 A | 6/2017 | | |
| JP | 2014024700 A | 2/2014 | | |
| KR | 20160092344 A | 8/2016 | | |

\* cited by examiner

ROLL-SHAPED AND CONTINUOUS GRAPHENE FILM AND MANUFACTURING METHOD THEREFOR

CROSS REFERENCE TO RELATED APPLICATIONS

This application is a continuation application of PCT/CN2017/098426, filed on 2017 Aug. 22. The contents of PCT/CN2017/098426 are all hereby incorporated by reference.

BACKGROUND

Technical Field

The present application relates to the field of graphene materials, and in particular, to a roll-shaped and continuous graphene film and a manufacturing method therefor.

Related Art

With continuous development of the electronic industry, devices such as smartphones, computers, and wearable electronic medical products are thinner and widely used, and become more flexible to be bent. Core components of these devices are gradually multi-integrated and multifunctional, and therefore, heat generated by a product when a part is running easily causes thermalization and break of a commodity. Therefore, effective heat dissipation of a heat emitting source of a core device, improvement of a heat radiation functional structure, and life prolonging of the core device are gradually paid more attention to. Carbon materials such as graphene that have quick thermal conductivity, heat radiation, ultrastrong physical property, heat resistance, chemical resistance, and high electric conductivity attract attention from people again.

In the conventional technology, a graphite composite film is obtained by using a graphite expanding method. Natural graphite is used as a raw material and is immersed into an acid, interlayer extension and expansion is performed on the graphite through heating, and high pressure processing is performed on the natural graphite and a binding material, so as to obtain a membranous graphite film. The minimum thickness of the film is 300 μm, only one axis is bent, and dispersity in a sharp surface of a micro part has a great deviation. Therefore, crystals may be brought in when performing graphitization, resulting in non-flexibility of the film.

In high-temperature carbonization and graphitization processes, a polymer film may be naturally creased and warped due to thermal expansion and contraction. Therefore, in an existing method for manufacturing a graphene film, a single polymer film is obtained by being clamped between flexible graphite papers for heat treatment. However, the size of such a graphene film is limited. The method requires an apparatus of a large capacity, many operators, a long production period, and high costs, has low production efficiency, and is limited in subsequent applications.

SUMMARY

To resolve the foregoing problems, the present application provides a roll-shaped and continuous graphene film and a manufacturing method therefor. By means of the method, large quantities of graphene films can be efficiently and continuously produced from roll to roll in large scales with low costs. Moreover, a manufactured graphene film has a high yield.

The present application provides a method for manufacturing a roll-shaped and continuous graphene film, including the following steps: S1. performing corona treatment on a PI film to obtain a corona PI film, and then coiling the corona PI film into a coiled material to be winded into a clamp with a heater; S2. placing the coiled material shaped in step S1 on a flowing conveyor belt to enter a carbonization area, heating the coiled material by the heater under protection of an inert gas, and carbonizing the coiled material at a first temperature to deintercalate H, O, and N atoms, so as to form a microcrystalline carbon precursor; and S3. placing the carbon precursor obtained in step S2 on the flowing conveyor belt to enter a graphitization area, heating the carbon precursor by the heater under the protection of the inert gas, and graphitizing the carbon precursor at a second temperature, so as to form a graphene film, where in the carbonization and graphitization processes, a central axis of the coiled material is perpendicular to a movement direction of the flowing conveyor belt, and the coiled material is horizontally placed and circularly rolls over at 360° around the central axis.

Preferably, the thickness of the PI film in step S1 is 6-75 μm, the length is 300-1000 m, and the width is 5.4-800 mm.

Preferably, the corona treatment in step S1 is introducing the PI film into plasma through voltage surge; and the flatness of the corona PI film is less than or equal to 10 nm, and the coarseness is greater than or equal to 2 nm.

Preferably, the heater is made of a carbon material or a graphite material, a core body is of an elongated circular shape; and the heater is provided with a temperature control unit and a speed control unit for gradual heating or cooling in the carbonization and the graphitization processes.

Preferably, the first temperature is 500-3300° C., and gradual heating is performed by using the heater; the first temperature is divided into three stages: a temperature of deintercalating the H atoms is 900-1100° C., a temperature of deintercalating the O atoms is 1800-2200° C., and a temperature of deintercalating the N atom is 2700-3300° C.; and the microcrystalline carbon precursor is generated at a speed of 1-2 mm/s.

Preferably, the second temperature is 1500-3200° C., and gradual heating is performed by using the heater; the second temperature is divided into three stages: a temperature at a first stage is 1500-2000° C., a temperature at a second stage is 2000-2800° C., and a temperature at a third stage is 2800-3200° C.; and the graphene film is generated at a speed of 0.55-1.5 mm/s.

Preferably, a nano metal material is doped in step S2 and/or step S3, so as to form quantum dots in the graphene.

Further, preferably, the doped nano metal material includes an alloy of at least one or two of calcium (Ca), stibium (Sb), niobium (Nb), yttrium (Y), molybdenum (Mo), silicon (Si), arsenic (As), indium (In), hafnium (Hf), and gallium (Ga), and has a particle size of 2-5 nm.

Preferably, the inert gas includes one or more of helium, nitrogen, argon, and neon, and has a pressure of 1-1.8 kgf/cm$^2$.

The present application further provides a roll-shaped and continuous graphene film obtained by using the manufacturing method described above.

Beneficial effects of the present application include: A dielectric constant of the PI film is improved through corona treatment, and a pinhole is filled, so that vertical and horizontal molecular structures of the film are consistent, thereby providing basis for subsequent manufacturing of a flat, even, and ordered graphene film. The corona PI film is coiled into a coiled material and is winded into the clamp, and the central axis of the coiled material is perpendicular to the movement direction of the flowing conveyor belt, so that space is fully utilized, thereby helping increase the thickness of the film, and facilitating continuous production from roll to roll in large scales with low costs. The coiled material is horizontally placed. This helps decrease the action of gravity; avoids imbalance between an upper portion and a lower portion of a same film due to the action of gravity in the carbonization and the graphitization processes; and also avoids material missing and damage due to collisions caused by circular rolling of the coiled material. As a result, the manufactured graphene film has a hexagonal planar mesh molecular structure. The structure is ordered and even, and has a large curved surface, small in-plane dispersity and deviation degree, and a high yield. In addition, in the carbonization and graphitization processes, the coiled material circularly rolls over at 360° around the central axis, so as to facilitate cyclical and balanced omnidirectional heating treatment, thereby greatly improving the efficiency.

More advantages can be obtained in further preferred solutions: Carbonization and graphitization are performed under the protection of multiple mixed inert gases, and the nano metal material is doped, so that the quantum dots can be formed in the graphene to generate electromagnetic shielding effectiveness (SE), thereby implementing opening and controlling of a band gap; and the multiple mixed inert gases serve as a medium that fills the quantum dots in an extension and micritization process of the graphitization, so as to form special anisotropy. Therefore, the film is thermally conductive in a horizontal direction but not thermally conductive in a perpendicular direction.

DETAILED DESCRIPTION

Embodiments of the present application are described below in detail. It should be stressed that the following descriptions are only exemplary, and are not intended to limit the scope and applications of the present application.

Embodiment 1

Figure 1:
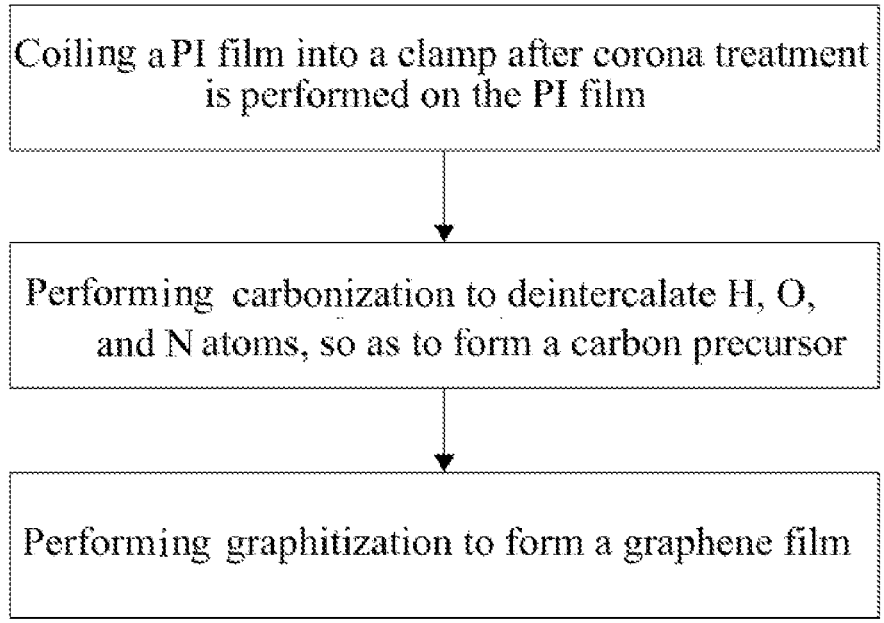
FIG. 1 is a schematic flowchart of a method for manufacturing a roll-shaped and continuous graphene film according to Embodiment 1 of the present application.

A method for manufacturing a roll-shaped and continuous graphene film is provided, and a schematic flowchart thereof is shown in FIG. 1. The method includes the following steps.

S1. Introduce a polyimide film from the Danbond Technology Co., Ltd. (the product name is DPI50, the thickness is 50 μm, the length is 500 m, the width is 500 mm, the film is manufactured through the prior art CN103289402A, a vitrification temperature is 400° C., and a temperature at which thermolysis starts is approximately 500° C.) into plasma through voltage surge for corona treatment, to obtain a corona PI film, where the obtained corona PI film has an improved dielectric constant, a filled pinhole, a flatness of 5 nm, and a coarseness of 5 nm, vertical and horizontal molecular structures of the film are consistent, and impact-resistant and wear-resistant performances of the film are improved; and coil the corona PI film into a coiled material to be winded into a clamp with a heater, where the heater is made of a carbon material, and a core body is in an elongated circular shape and has a length matching the width of the PI film.

S2. Place the coiled material shaped in step S1 on a flowing conveyor belt to enter a carbonization area; the heater starts to heat the coiled material gradually from the temperature of 500° C. under protection of nitrogen, where the nitrogen has a pressure of 1.5 kgf/cm$^2$; separately deintercalate H, O, and N atoms at 1000° C., 2000° C., and 3000° C., so as to generate microcrystalline carbon precursor at a speed of 1.5 mm/s; and after carbonization is completed, accelerate cyclical cooling, where a cooling rate is 5-10° C./min, and the entire carbonization process is completed within 2 hours.

S3. Place the carbon precursor obtained in step S2 on the flowing conveyor belt to enter a graphitization area; the heater heats the carbon precursor gradually under the protection of nitrogen, where the nitrogen has a pressure of 1.5 kgf/cm$^2$, and a temperature zone is divided into three stages: 1800° C., 2500° C., and 3000° C.; and perform graphitization, so as to generate a graphene film at a speed of 1.0 mm/s.

Figure 2:
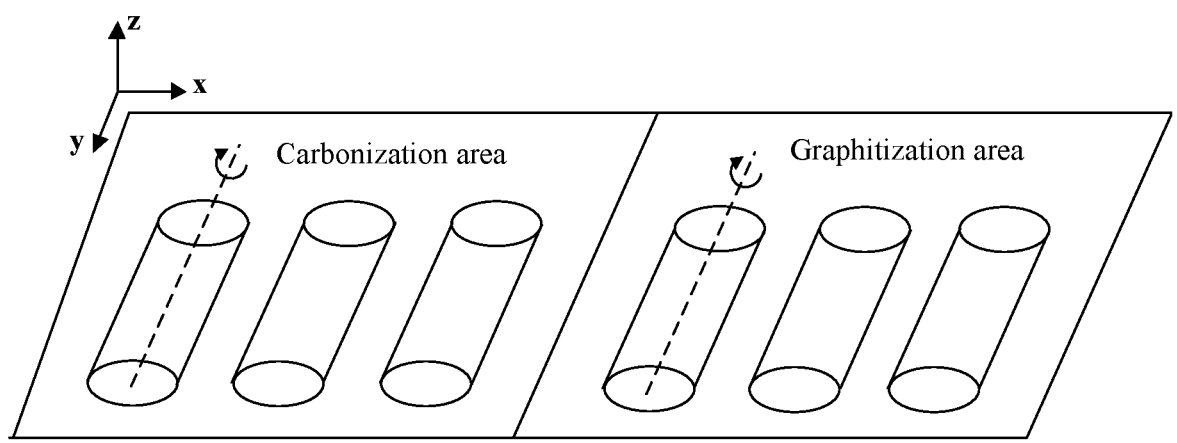
FIG. 2 is a schematic diagram of a manner of placing a coiled material in carbonization and graphitization processes according to Embodiment 1 of the present application.

In the carbonization and graphitization processes, a manner of placing the coiled material is shown in FIG. 2. A central axis (y) of the coiled material is perpendicular to a movement direction (x) of the flowing conveyor belt. The coiled material is horizontally placed and circularly rolls over at 360° around the central axis, and a direction of cyclical rolling may be the same as or contrary to a forwarding direction of the flowing conveyor belt.

The central axis (y) of the coiled material is perpendicular to the movement direction (x) of the flowing conveyor belt, so that space is fully utilized, thereby helping increase the thickness of the film, and facilitating continuous production from roll to roll in large scales with low costs. The coiled material is horizontally placed. This helps decrease the action of gravity; avoids imbalance between an upper portion and a lower portion of a same film due to the action of gravity in the carbonization and the graphitization processes; and also avoids material missing and damage due to collisions caused by circular rolling of the coiled material. The H, O, and N atoms are deintercalated through high-temperature carbonization, so that polymer heat treatment is performed at a temperature close to that of single crystal graphite, and C atoms are arranged again. As a result, an even and continuous microcrystalline heteroaromatic compound is formed, and a microcrystalline carbon precursor having a good artificial heterologous graphite structure is finally formed. The carbon precursor has an ordered and even structure, a large curved surface, and small in-plane dispersity and deviation degree, thereby achieving plane properties. After the carbon precursor is carbonized, a carbon structure is restructured; and C atoms at a microcrystalline edge move intensively after a high-temperature acceleration, and are bonded to each other in a microcrystalline state to generate macromolecules, so as to start hexagonal mesh construction and combination and perform crystal alignment. A hexagonal carbon mesh layer is formed and gradually grows, and changes from one axis into two axes, so that a flexible structure in a graphene form that can be bent and has large tortuosity and extremely small in-plane dispersity and deviation degree is generated. The graphene form is two-dimensional crystallization. The atoms, are regularly configured into a form of planar hexagonal lattices by following a hexagonal construction rule. Each carbon atom is bonded by three C atoms, one of four outer shell electrons in chemical bonding is in a free movement state, and the free electron may move along a crystal lattice. Therefore, the graphene has a very high electric conductivity in a plane direction.

The graphene film manufactured in this way has an ordered and even structure, a large curved surface, and small in-plane dispersity and deviation degree, and has a tensile strength of 800 mpa, a thermal expansion coefficient of 0.5 PP/° C., and a thermal conductivity of 2800 w/mk. A highest peak, that is a G peak, of a crystal structure is located at the right side of 1582.6 $cm^{-1}$; a second highest peak is a 2D double-peak structure and is located at 2719.8 $cm^{-1}$; and a D peak at 1363 $cm^{-1}$ and at the right side of the G peak is very small. Therefore, the structure has few defects.

Embodiment 2

This embodiment differs from Embodiment 1 in that: in step S1, the polyimide film (PI film) has a thickness of 75 μm, a length of 1000 m, and a width of 800 mm, and the obtained corona PI film has a flatness of 10 nm and a coarseness of 3 nm; in step S2, temperatures of deintercalating the H, O, and N atoms are respectively 1100° C., 2200° C., and 3300° C., and the microcrystalline carbon precursor is generated at a speed of 2 mm/s; and in step S3, the three stages of the temperature zone of the graphitization are respectively 2000° C., 2800° C., and 3200° C., and the graphene film is generated at a speed of 0.55 mm/s. A graphene film manufactured in this way has an ordered and even structure, a large curved surface, and small in-plane dispersity and deviation degree, and has a tensile strength of 600 mpa, a thermal expansion coefficient of 1.0 PP/° C., and a thermal conductivity of 2000 w/mk. A highest peak, that is a G peak, of a crystal structure is located at the right side of 1582.6 $cm^{-1}$; a second highest peak is a 2D double-peak structure and is located at 2719.8 $cm^{-1}$; and a D peak at 1363 $cm^{-1}$ and at the right side of the G peak is very small. Therefore, the structure has few defects.

Embodiment 3

This embodiment differs from Embodiment 1 in that: in step S1, the PI film has a thickness of 6 μm, a length of 300 m, and a width of 5.4 mm, and the obtained corona PI film has a flatness of 2 nm and a coarseness of 8 nm; in step S2, temperatures of deintercalating the H, O, and N atoms are respectively 900° C., 1800° C., and 2700° C., and the microcrystalline carbon precursor is generated at a speed of 1.0 mm/s; and in step S3, the three stages of the temperature zone of the graphitization are respectively 1500° C., 2000° C., and 2800° C., and the graphene film is generated at a speed of 1.5 mm/s. A graphene film manufactured in this way has an ordered and even structure, a large curved surface, and small in-plane dispersity and deviation degree, and has a tensile strength of 1000 mpa, a thermal expansion coefficient of 0.1 PP/° C., and a thermal conductivity of 3000 w/mk. A highest peak, that is a G peak, of a crystal structure is located at the right side of 1582.6 $cm^{-1}$; a second highest peak is a 2D double-peak structure and is located at 2719.8 $cm^{-1}$; and a D peak at 1363 $cm^{-1}$ and at the right side of the G peak is very small. Therefore, the structure has few defects.

Embodiment 4

This embodiment differs from Embodiment 1 in that: in the carbonization and the graphitization processes, the inert gas is a mixed gas of nitrogen, argon, and neon; the pressure of the mixed gas is 1.5 $kgf/cm^2$; and a nano metal material is doped to form quantum dots, so as to manufacture a graphene quantum carbon radical, thereby implementing opening and controlling of a graphene band gap. A nano transition metal is connected to the graphene by using a covalent bond. When electron clouds are overlapped, there is a conjugate system (a delocalized π bond), and two atoms share electron pairs. Electrons move over a nano barrier to form a Fermi electron sea. The electrons pass through a quantum barrier from one quantum well to enter another quantum well, to form quantum tunnel effect, structural effect, and quantum confinement effect. The doped nano metal material is InAs, and a graphene quantum carbon radical having InAs quantum dots is formed.

A graphene film manufactured in this way has an ordered and even structure, a large curved surface, and small in-plane dispersity and deviation degree, and has a tensile strength of 800 mpa, a thermal expansion coefficient of 0.5 PP/° C., and a thermal conductivity of 2800 w/mk. A highest peak, that is a G peak, of a crystal structure is located at the right side of 1582.6 $cm^{-1}$; a second highest peak is a 2D double-peak structure and is located at 2719.8 $cm^{-1}$; and a D peak at 1363 $cm^{-1}$ and at the right side of the G peak is very small. Therefore, the structure has few defects.

In addition to the foregoing features same as those in Embodiment 1, the graphene film manufactured in this way has a quantum dot density of $(1 \times 10^{10})$-$(3 \times 10^{10})$ $cm^{-2}$ due to the doping of the nano metal and a band gap width of 1.3-1.4 ev. Three or more mixed inert gases serve as a medium that fills the quantum dots in an extension and micritization process of the graphitization, so as to form special anisotropy. A vertical thermal conductivity of the graphene film is merely 0.3% of a planar thermal conductivity.

Some variations may be made to this embodiment. In addition to the InAs, the doped nano metal material may alternatively be an alloy of at least one or two of Ca, Sb, Nb, Y, Mo, Si, As, In, Hf, and Ga.

The mixed inert gas includes three or more of helium, nitrogen, argon, and neon, and has a pressure of 1-1.8 $kgf/cm^2$.

Comparative Example 1

Figure 3:
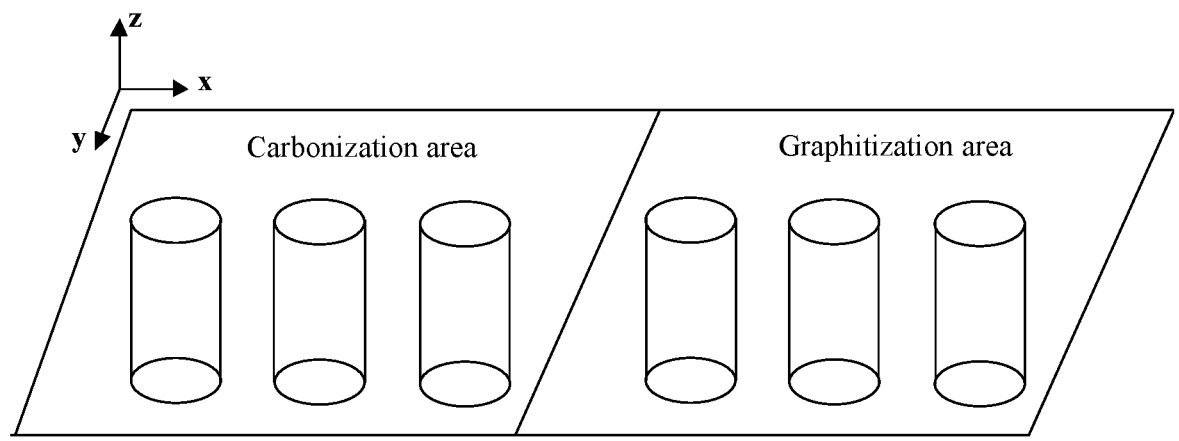
FIG. 3 is a schematic diagram of a manner of placing a coiled material in carbonization and graphitization processes according to Comparative example 1 of the present application.

This comparative example differs from Embodiment 1 in that: In the carbonization and the graphitization processes, a manner of placing the coiled material is shown in FIG. 3. The central axis (z) of the coiled material is perpendicular to the movement direction (x) of the flowing conveyor belt; and the coiled material is vertically placed. Because of being vertically placed, the coiled material cannot circularly roll over at 360°. Consequently, heating in the carbonization and the graphitization is uneven. In addition, because of the action of gravity, an upper portion and a lower portion of the film are easy to be imbalanced.

A graphene film manufactured in this way has an uneven up-down structure, a small curved surface, and great in-plane dispersity and deviation degree, and has a tensile strength of 100 mpa, a thermal expansion coefficient of 10 PP/° C., and a thermal conductivity of 500 w/mk.

Comparative Example 2

Figure 4:
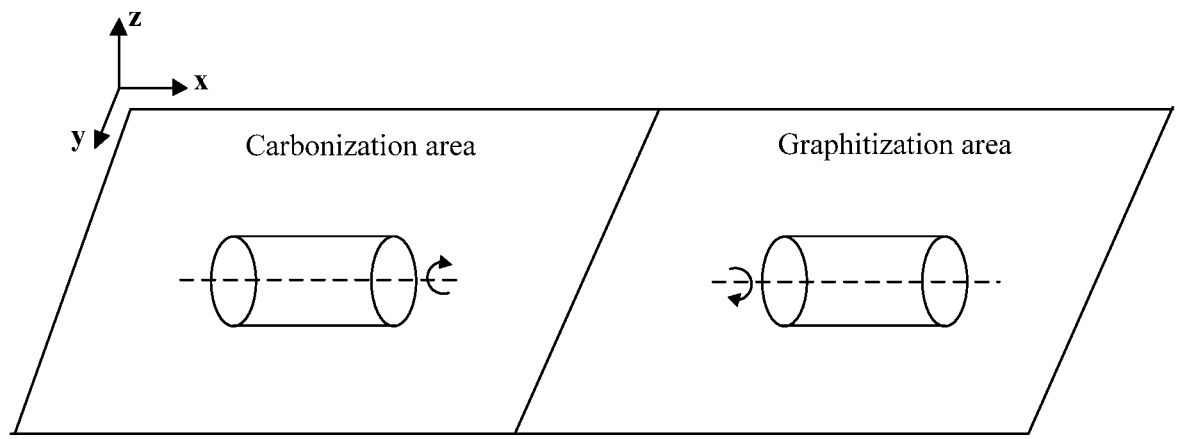
FIG. 4 is a schematic diagram of a manner of placing a coiled material in carbonization and graphitization processes according to Comparative example 2 of the present application.

This comparative example differs from Embodiment 1 in that: In the carbonization and the graphitization processes, a manner of placing the coiled material is shown in FIG. 4. The central axis of the coiled material is parallel to the movement direction (x) of the flowing conveyor belt; and the coiled material is horizontally placed. The central axis of the coiled material is parallel to the movement direction (x) of the flowing conveyor belt. Therefore, when the coiled material circularly rolls over at 360°, the coiled material may easily collide with an inner wall edge of a heating area, resulting in missing and damage of the material.

A graphene film manufactured in this way has a damaged appearance, an uneven structure, a small curved surface, and great in-plane dispersity and deviation degree, and has a tensile strength of 50 mpa, a thermal expansion coefficient of 15 PP/° C., and a thermal conductivity of 300 w/mk.

The foregoing content further describes the present application in detail with reference to the specific/preferred implementations, and it cannot be deemed that the specific implementations of the present application are limited to these descriptions only. A person of ordinary skill in the art may further make various replacements or variations to the described implementations without departing from the concept of the present application, and these replacements or variations shall fall within the protection scope of the present application.

What is claimed is:

1. A method for manufacturing a roll-shaped and continuous graphene film, comprising:
   S1: performing corona treatment on a polyimide (PI) film to obtain a corona PI film, and then coiling the corona PI film into a coiled material to be winded into a clamp with a heater;
   S2: placing the coiled material shaped in step S1 on a flowing conveyor belt to enter a carbonization area, heating the coiled material by the heater under protection of an inert gas, and carbonizing the coiled material at a first temperature to deintercalate H, O, and N atoms, so as to form a microcrystalline carbon precursor; and
   S3: placing the microcrystalline carbon precursor obtained in step S2 on the flowing conveyor belt to enter a graphitization area, heating the microcrystalline carbon precursor by the heater under protection of the inert gas, and graphitizing the microcrystalline carbon precursor at a second temperature, so as to form a graphene film,
   wherein, in step S2, a central axis of the coiled material is perpendicular to a movement direction of the flowing conveyor belt, and the coiled material is horizontally placed and circularly rolls 360° around the central axis thereof,
   in step S3, a central axis of the microcrystalline carbon precursor is perpendicular to a movement direction of the flowing conveyor belt, and the microcrystalline carbon precursor is horizontally placed and circularly rolls 360° around the central axis thereof.

2. The manufacturing method according to claim 1, wherein the PI film has a thickness in a range of 6-75 μm, a length in a range of 300-1000 m, and a width in a range of 5.4-800 mm.

3. The manufacturing method according to claim 1, wherein the corona treatment in step S1 includes introducing the PI film into plasma through voltage surge, and
   the corona PI film has a flatness less than or equal to 10 nm and a coarseness greater than or equal to 2 nm.

4. The manufacturing method according to claim 1, wherein the heater is made of a material including a carbon material or a graphite material, and has a core body being an elongated circular shape; and the heater is provided with a temperature control unit and a speed control unit for gradual heating or cooling in the carbonizing and graphitizing of step S2 and S3.

5. The manufacturing method according to claim 1, wherein the first temperature is in a range of 500-3300° C.,
   the heater performs a gradual heating in the carbonizing of the coiled material, and the first temperature includes: a temperature of deintercalating H atoms in a range of 900-1100° C.; a temperature of deintercalating O atoms in a range of 1800-2200° C.; and a temperature of deintercalating N atoms in a range of 2700-3300° C., and
   the microcrystalline carbon precursor is generated at a speed of 1-2 mm/s.

6. The manufacturing method according to claim 1, wherein the second temperature is in a range of 1500-3200° C., and
   the heater performs a gradual heating in the graphitizing of the microcrystalline carbon precursor, and the second temperature includes: a temperature at a first stage in a range of 1500-2000° C.; a temperature at a second stage in a range of 2000-2800° C.; and a temperature at a third stage in a range of 2800-3200° C., and
   the graphene film is generated at a speed of 0.55-1.5 mm/s.

7. The manufacturing method according to claim 1, wherein a nano metal material is doped in step S2 and/or step S3, so as to form quantum dots in the graphene.

8. The manufacturing method according to claim 7, wherein the nano metal material comprises an alloy of at least one or two of Ca, Sb, Nb, Y, Mo, Si, As, In, Hf, and Ga; and the nano metal material has a particle size of 2-5 nm.

9. The manufacturing method according to claim 1, wherein the inert gas comprises one or more of helium, nitrogen, argon, and neon, and has a pressure of 1-1.8 kgf/cm².

* * * * *